US006623662B2

(12) United States Patent
Wang et al.

(10) Patent No.: US 6,623,662 B2
(45) Date of Patent: Sep. 23, 2003

(54) CARBON BLACK COATING FOR CRT DISPLAY SCREEN WITH UNIFORM LIGHT ABSORPTION

(75) Inventors: Kuo-Chu Wang, Taipei (TW); Chun-Min Hu, Keelung (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 5 days.

(21) Appl. No.: 09/864,063

(22) Filed: May 23, 2001

(65) Prior Publication Data

US 2002/0175315 A1 Nov. 28, 2002

(51) Int. Cl.[7] .................... B05D 5/12; B32B 5/30; H01J 31/00; C09D 5/24

(52) U.S. Cl. ................ 252/502; 252/518.1; 252/520.1; 252/520.21; 428/331; 428/357; 428/380; 106/38.28; 106/455; 106/688; 427/122; 427/126.3; 313/479; 423/335; 423/617; 423/618; 423/624

(58) Field of Search .................... 252/518.1, 520.1, 252/520.21; 423/87, 89, 335, 339, 617, 618, 624; 106/316, 445, 455; 428/331, 357, 379, 402; 313/364, 479; 427/68, 164, 122

(56) References Cited

U.S. PATENT DOCUMENTS

| | | | | |
|---|---|---|---|---|
| 2,522,531 | A | 9/1950 | Mochel | 117/54 |
| 2,564,677 | A | 8/1951 | Davis | 201/73 |
| 2,564,707 | A | 8/1951 | Mochel | 117/54 |
| 2,564,709 | A | 8/1951 | Mochel | 201/73 |
| 2,564,710 | A | 8/1951 | Mochel | 201/73 |
| 2,612,611 | A | 9/1952 | Szegho et al. | 250/80 |
| 2,680,205 | A | 6/1954 | Burton | 313/92 |
| 2,734,142 | A | 2/1956 | Barnes | 313/92 |
| 2,808,351 | A | 10/1957 | Colbert et al. | 117/211 |
| 2,833,902 | A | 5/1958 | Gaiser et al. | 201/73 |
| 2,852,415 | A | 9/1958 | Colbert et al. | 117/211 |
| 2,919,212 | A | 12/1959 | Gaiser | 117/215 |
| 2,977,412 | A | 3/1961 | Rhodes et al. | 178/7.85 |
| 3,093,598 | A | 6/1963 | McMillan et al. | 252/521 |
| 3,252,829 | A | 5/1966 | Romstadt et al. | 117/211 |
| 3,689,312 | A | 9/1972 | Long, III et al., | 117/94 |
| 3,738,732 | A | 6/1973 | Ikenda | 117/33.3 |
| 4,263,335 | A | 4/1981 | Wagner et al. | 427/29 |

(List continued on next page.)

FOREIGN PATENT DOCUMENTS

| | | | |
|---|---|---|---|
| EP | 0 585 819 A1 | 8/1993 | |
| JP | 3-167739 | 3/1991 | H01J/29/88 |
| JP | 5-36365 | 2/1993 | H01J/29/88 |
| JP | 06-344489 | * 12/1994 | B32B/9/00 |

OTHER PUBLICATIONS

Product Data Sheet for Irgalite Blue BSNF Pigment from CIBA, 2001.*

Chang, Raymond; Chemistry 3rd ed.; *Acids and Bases: General Properties* pp. 622–623.

*Primary Examiner*—Yogendra N. Gupta
*Assistant Examiner*—Kallambella Vijayakumar
(74) *Attorney, Agent, or Firm*—Emrich & Dithmar

(57) ABSTRACT

A two-layer coating for the outer surface of the display screen of a color cathode ray tube (CRT) includes an inner carbon black-based layer and an outer silica-based layer. The inner layer is antistatic, while the outer layer is antireflective. To compensate for the increased absorption of blue light by the carbon black particles, which results in a color video image having a yellowish tint, a blue additive, such as a pigment or dye, is added to the coating to adjust its light absorbance characteristics and provide uniform light absorbance over the entire visible spectrum of 400–700 nm for improved color video image presentation.

14 Claims, 2 Drawing Sheets

U.S. PATENT DOCUMENTS 4,393,095 A 7/1983 Greenberg .................. 427/87
4,463,114 A 7/1984 Balchunis et al. .......... 524/157
4,468,702 A 8/1984 Jandrell ...................... 358/245
4,490,227 A 12/1984 Bitter ......................... 204/192
4,563,612 A 1/1986 Deal et al. .................. 313/478
4,649,126 A 3/1987 Gaprindashvili et al. ..... 501/43
4,650,557 A 3/1987 Bitter .................... 204/192.12
4,695,045 A 9/1987 Chase et al. ................ 269/152
4,785,217 A 11/1988 Matsuda et al. ............ 313/479
4,857,361 A 8/1989 Bloss et al. ................. 427/109
4,884,006 A 11/1989 Prazak, III .................. 313/474
4,885,501 A 12/1989 Tong .......................... 313/402
4,930,015 A 5/1990 Dougherty et al. ......... 358/246
4,945,282 A 7/1990 Kawamura et al. ......... 313/479
4,958,148 A 9/1990 Olson ......................... 340/712
4,987,338 A 1/1991 Itom et al. .................. 313/478
5,011,443 A 4/1991 Park ............................. 445/2
5,051,652 A 9/1991 Isomura et al. ............. 313/479
5,099,171 A 3/1992 Daiku et al. ................ 313/479
5,122,709 A 6/1992 Kawamura et al. ......... 313/479
5,150,004 A 9/1992 Tong et al. ................. 313/479
5,189,337 A 2/1993 Endo et al. ................. 313/479
5,200,667 A 4/1993 Iwasaki et al. ............. 313/478
5,204,177 A 4/1993 Sato et al. .................. 428/328
5,241,097 A 8/1993 Zupancic et al. ........... 556/460
5,254,904 A 10/1993 Van De Leest et al. .... 313/479
5,279,851 A 1/1994 Minosou et al. ......... 427/126.2
5,291,097 A 3/1994 Kawamura et al. ......... 313/478
5,322,540 A 6/1994 Jacquet et al. ............... 65/60.2
5,370,981 A 12/1994 Krafft et al. ................ 430/529
5,372,924 A 12/1994 Quintens et al. ............ 430/527
5,376,308 A 12/1994 Hirai et al. ................. 252/518
5,378,404 A 1/1995 Han et al. ................... 252/500
5,382,383 A 1/1995 Hirai et al. .............. 252/501.1
5,387,433 A 2/1995 Balian et al. ............ 427/126.3
5,404,073 A 4/1995 Tong et al. ................. 313/479
5,412,279 A 5/1995 De Boer ..................... 313/479
5,443,944 A 8/1995 Krafft et al. ................ 430/529
5,489,369 A 2/1996 Bjornard et al. ....... 204/298.25
5,492,762 A 2/1996 Hirai et al. ................. 428/447
5,591,517 A * 1/1997 Takamiya et al. ........ 428/304.4
6,143,418 A * 11/2000 Takamiya et al. ........... 428/434
6,351,063 B1 * 2/2002 Lee et al. ................... 313/479

* cited by examiner

CARBON BLACK COATING FOR CRT DISPLAY SCREEN WITH UNIFORM LIGHT ABSORPTION

FIELD OF THE INVENTION

This invention relates generally to self-emitting color display devices such as color cathode ray tubes (CRTs) and is particularly directed to a black surface coating for the display screen of a color CRT for providing a high level of video image contrast while affording uniform light absorbance over the entire visible spectrum for improved color video image presentation.

BACKGROUND OF THE INVENTION

Self-emitting display devices, such as of the CRT-type, produce a video image by the bombardment of phosphor elements disposed on the inner surface of the device's display screen by high energy electrons. In a color display device, the phosphor elements are separated into three groups, with each group emitting one of the primary colors of red, green or blue when impinged upon by the energetic electrons.

Typically disposed on the outer surface of the device's display screen is a two-layer coating in the form of an inner antistatic layer and an outer antireflective layer containing silica. The inner antistatic layer typically includes electrically conductive carbon black particles, but may also include antimony-doped tin oxide or indium-doped tin oxide. The electrically conductive antistatic layer provides electrostatic shielding for the display device as well as grounding of electrostatic charge which tends to build-up on the display screen. The carbon black particles also absorb light nonuniformily over the visible spectrum. In particular, the carbon black particles absorb more blue light having a wavelength in the range of 400–500 nm than light of other wavelengths in the visible spectrum. Absorption of blue light by the carbon black particles in the antistatic layer gives rise to a color video image having a yellowish tint. This detracts from the appearance of the video image because of poor color purity.

The present invention addresses the aforementioned limitations of the prior art by providing a coating for the outer surface of a video display screen having electrically conductive carbon black particles as well as a blue pigment, or dye, to provide a "pure black" layer which is characterized by uniform light absorbance over the entire visible spectrum for improved video image presentation.

OBJECTS AND SUMMARY OF THE INVENTION

Accordingly, it is an object of the present invention to provide an optical coating for the outer surface of a cathode ray tube (CRT) display screen having improved light absorption characteristics.

Another object of the present invention to provide a carbon black-based coating for a CRT display screen having uniform light absorption characteristics over the entire visible spectrum for improved color video image presentation.

Yet another object of the present invention is to provide a CRT display screen coating containing carbon black particles and further incorporating a blue pigment, or dye, to compensate for increased blue light absorption by the carbon black to provide uniform color absorption over the entire visible spectrum for improved video image color purity.

A further object of the present invention is to provide an improved color video image on the display screen of a self-emitting display device by permanently affixing an electrically conductive color filter on the outer surface of the device's display screen which absorbs light uniformly over the entire visible spectrum.

The present invention contemplates an electrically conductive coating for an outer surface of a glass display screen of a self-emitting display device, wherein the glass display screen further includes a phosphor coating on an inner surface thereof, and wherein the phosphor coating is responsive to energetic electrons incident thereon for providing a video image, the coating comprising: a thin layer of carbon black solution having a black appearance and disposed on the outer surface of the device's glass display screen; and a blue additive in the carbon black solution to reduce absorbance of blue light by the carbon black and provide substantially uniform color absorption by the carbon black solution over the visible light spectrum.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
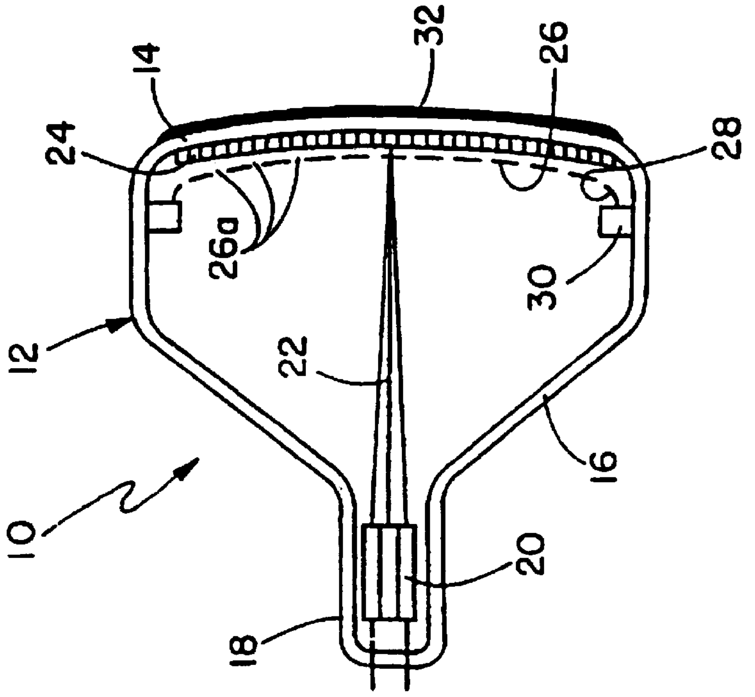
FIG. 1 is a longitudinal section view of a CRT incorporating an antistatic/antireflective coating in accordance with the principles of the present invention.

Referring to FIG. 1, there is shown a longitudinal sectional view of a color CRT 10 incorporating an antistatic/antireflective coating 32 containing carbon black particles in accordance with the present invention. In the following discussion the term "display screen", "display panel" and "faceplate" are used interchangeably. In addition, the terms "layer" and "coating" are used synonymously. CRT 10 includes a sealed glass envelope 12 having a forward faceplate or display screen 14, an aft neck portion 18, and an intermediate funnel portion 16. Disposed on the inner surface of glass display screen 14 is a phosphor screen 24 which includes plural discrete phosphor deposits, or elements, which emit light when an electron beam is incident thereon to produce a video image on the display screen. Color CRT 10 includes three electron beams 22 directed onto and focused upon the CRT's glass display screen 14. Disposed in the neck portion 18 of the CRT's glass envelope 12 are plural electron guns 20 typically arranged in an inline array for directing the electron beams 22 onto the phosphor screen 24. The electron beams 22 are deflected vertically and horizontally in unison across the phosphor screen 24 by a magnetic deflection yoke which is not shown in the figure for simplicity. Disposed in a spaced manner from phosphor screen 24 is a shadow mask 26 having a plurality of spaced electron beam passing apertures 26*a* and a skirt portion 28 around the periphery thereof. The shadow mask skirt portion 28 is securely attached to a shadow mask mounting fixture 30 around the periphery of the shadow mask. The shadow mask mounting fixture 30 is attached to an inner surface of the CRT's glass envelope 12 and may include conventional attachment and positioning structures such as a mask attachment frame and a mounting spring which also are not shown in the figure for simplicity. The shadow mask mounting fixture 30 may be attached to the inner surface of the CRT's glass envelope 12 and the shadow mask 26 may be attached to the mounting fixture by conventional means such as weldments or a glass-based frit.

Figure 2:
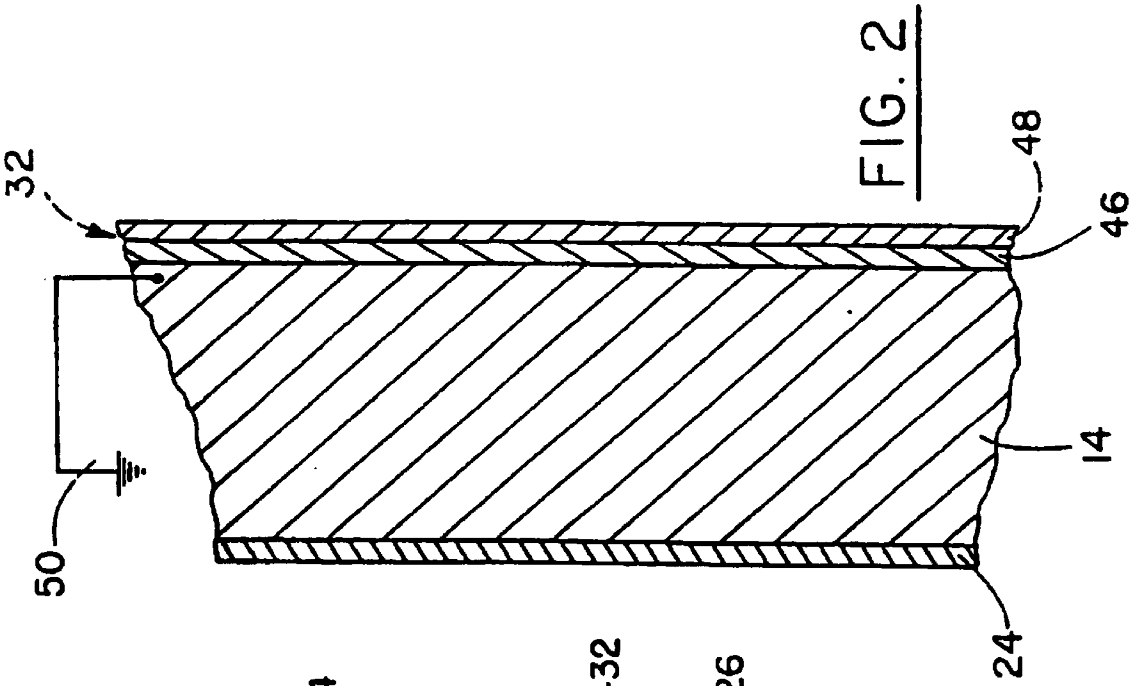
FIG. 2 is a partial sectional view of a flat display screen with a two-layer antistatic/antireflective coating on its outer surface in accordance with the present invention.

Referring to FIG. 2, there is shown a partial sectional view of a portion of the CRT's glass display screen 14 having the aforementioned phosphor layer 24 on the inner surface thereof and an outer antistatic/antireflective coating 32 on the outer surface thereof in accordance with the present invention. The glass display screen 14 of FIG. 2 is shown as being flat as the present invention is applicable with both curved display screens as shown in FIG. 1 as well as to flat display screens as shown in FIG. 2. In addition, while the present invention has been illustrated in the figures in terms of use of the outer surface of the display screen of a CRT, the present invention is not limited to use with this type of display device. For example, the antistatic/antireflective coating 32 of the present invention may be used equally as well on the outer surface of the display panel of virtually any type of self-emitting color display device, i.e., where the video image is produced by phosphor activated by energetic electrons incident thereon. Self-emitting color display devices other than CRTs include field emission displays, plasma discharge panels, vacuum fluorescent screens, and gas discharge screens. The phosphor layer 24 disposed on the inner surface of the glass display screen 14 may be in the form of a large number of discrete dots or stripes.

In accordance with the present invention, the antistatic/antireflective coating 32 includes an inner antistatic layer 46 and an outer antireflective layer 48. A conductor 50 may be attached to the inner antistatic layer 46 or to the outer surface portion of the display screen 14 for electrically coupling the display screen to neutral ground potential. The inner antistatic layer 46 contains carbon black particles and may also contain antimony-doped tin oxide or indium-doped tin oxide. The antimony-doped tin oxide (ATO) and indium-doped tin oxide (ITO) provide the antistatic layer with electrical conductivity. The carbon black particles in the inner antistatic layer 46 may also be electrically conductive for facilitating discharge of an electrostatic charge on the CRT's display screen 14 to neutral ground via electrical conductor 50. The electrically conductive ATO or ITO particles, or the carbon black particles, if conductive, also serve as a shield for the electromagnetic field generated by the CRT. The outer antireflective layer 48 preferably includes silica. The antistatic/antireflecting coating 32 has a thickness on the order of 0.1 micron.

The carbon black particles in the inner antistatic layer 46 also provide the CRT's glass display screen 14 with a high degree of video image contrast. However, carbon black is characterized as absorbing blue light to an extent greater than it absorbs any other color in the visible light spectrum. More specifically, carbon black absorbs light having a wavelength of the range of 400–500 nm to a degree greater than light having any other wavelength in the visible spectrum of 400–700 nm. This increased absorption of blue light by the carbon black particles results in a video image having a yellowish tint which degrades video image presentation. In order to improve the presentation of the video image on the CRT's glass display screen 14, the inner antistatic layer 46 of the present invention is also provided with a blue additive for increasing its blue component and reducing the yellowish tint of the video image. The blue additive, which may be in the form of a dye or pigment, renders the light absorption characteristics of the inner antistatic layer 46 substantially uniform over the entire visible spectrum. This eliminates the yellowish tint from the video image and substantially improves its appearance.

Figure 3:
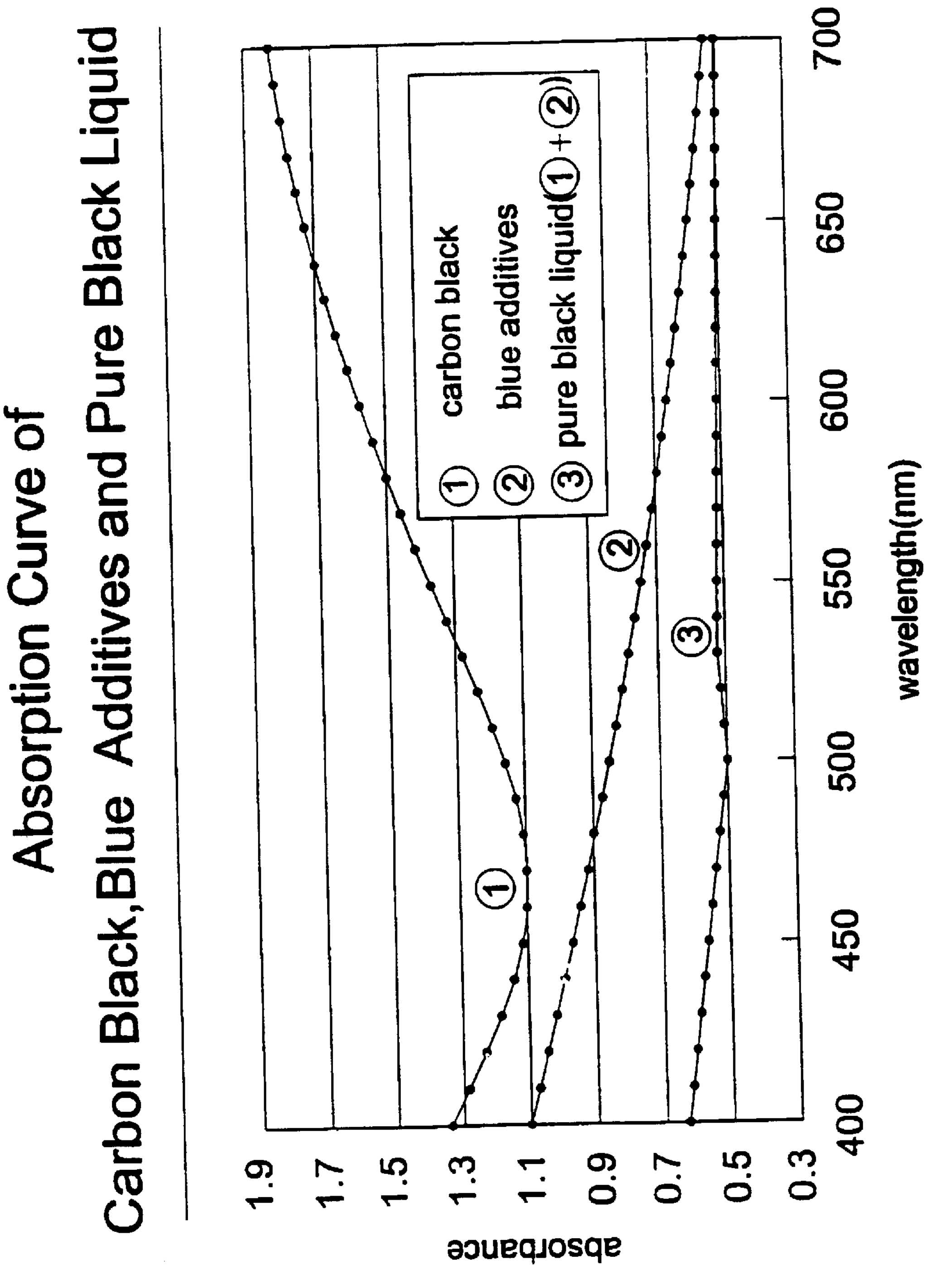
FIG. 3 is a graphic representation of the light absorption of a carbon black coating containing a blue additive over the visible light spectrum of 400–700 nm in accordance with the present invention.

Referring to FIG. 3, there is shown a graphic representation of the light absorption of a carbon black coating containing a blue additive over the visible spectrum in the present invention. Curve 1 in FIG. 3, shows the absorption over the visible spectrum of a coating comprised of carbon black particles. This coating shows increased light absorption at wavelengths of the range of 400–500 nm. Curve 2 shows the light absorption or a coating containing a blue additive such as in the form of a dye or pigment. The coating with the blue additive shows reduced light absorption at wavelengths in the range of 400–500 nm. Curve 3 is a graphic illustration of the light absorption over the entire visible spectrum of a coating containing carbon black articles as well as a blue additive in accordance with the present invention. This latter coating exhibits substantially uniformed light absorbance over the entire visible spectrum of 400–700 nm. In a preferred embodiment, an antistatic coating containing carbon black particles as well as a blue additive in accordance with the present invention is 1 micron thick. The weight % of the blue additive to the carbon black in the coating is in the range of 5%–60%. The preferred blue additive incorporated in the carbon particle-based antistatic coating is CIBA blue pigment BSNF.

There has thus been shown a two-layer coating for the outer surface of a color video display screen which is comprised of an inner carbon black-based antistatic layer and an outer silica-based antireflective layer. To compensate for increased absorption of blue light, i.e., wavelength of 400–500 nm, by the carbon black particles, a blue additive, such as in the form of a dye or pigment, is added to the coating to adjust the light absorbance characteristics of the inner antistatic layer so as to provide uniform light absorbance over the entire visible spectrum of 400–700 nm.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. An electrically conductive coating for an outer surface of a glass display screen of a self-emitting display device, wherein said glass display screen further includes a phosphor coating on an inner surface thereof, and wherein said phosphor coating is responsive to energetic electrons incident thereon for providing a video image, said coating comprising:

a thin layer of a solution of carbon black particles having a black appearance and disposed on the outer surface of the device's glass display screen;

a blue additive dispersed in said carbon black solution to reduce absorbance of blue light by the carbon black and provide substantially uniform color absorption by said carbon black solution over the visible light spectrum, wherein said blue additive reduces the absorbance of light having a wavelength in the range of 400–500 nm and has a weight % relative to said carbon black particles of 5–60% and an antireflective layer disposed on said thin layer of carbon black solution.

2. The coating of claim 1 wherein said blue additive is a dye or pigment.

3. The coating of claim 1 further comprising indium-doped tin oxide.

4. The coating of claim 1 further comprising antimony-doped tin oxide.

5. The coating of claim 1 wherein said antireflective layer includes silica.

6. The coating of claim 1 wherein said blue additive is Cu-phthalocyanine.

7. The coating of claim 1 having a thickness on the order of 0.1 micron.

8. An ant static/antireflective coating for the outer surface of a display screen of a self-emitting color display device whereon is presented a color video image, said antistatic/antireflective coating comprising:

a thin antistatic layer of a solution containing carbon black particles disposed on the outer surface of the display screen, wherein said solution containing carbon black particles is black in appearance for improved video image contrast and is electrically conductive for discharging an electrostatic charge on the display screen to neutral ground and providing an electrostatic shield for the display device;

an antireflective layer disposed on said antistatic layer; and a blue additive dispersed in said antistatic layer for reducing absorbance of blue light by said carbon particles and providing substantially uniform color absorption by said antistatic layer over the visible light spectrum, wherein said blue additive reduces the absorbance of light having a wavelength in the range of 400–500 nm and has a weight % relative to said carbon black particles of 5–60%.

9. The antistatic/antireflective coating of claim 8 wherein said blue additive is a dye or pigment.

10. The antistatic/antireflective coating of claim 8 wherein said antistatic layer further includes indium-doped tin oxide.

11. The antistatic/antireflective coating of claim 8 wherein said antistatic layer further includes antimony-doped tin oxide.

12. The antistatic/antireflective coating of claim 8 wherein said blue additive is Cu-phthalocyanine.

13. The antistatic/antireflective coating of claim 8 having a thickness on the order of 0.1 micron.

14. The antistatic/antireflective coating of claim 8 wherein said antireflective layer includes silica.

* * * * *

UNITED STATES PATENT AND TRADEMARK OFFICE

CERTIFICATE OF CORRECTION

PATENT NO. : 6,623,662 B2

DATED : September 23, 2003

INVENTOR(S) : Kuo-Chu Wang et al.

It is certified that error appears in the above-identified patent and that said Letters Patent is hereby corrected as shown below:

Column 5,

Line 6, after "5-60%" insert a semi-colon -- ; --

Line 21, delete "ant static" and insert -- antistatic -- in its place.

Signed and Sealed this

Second Day of December, 2003

JAMES E. ROGAN

*Director of the United States Patent and Trademark Office*